United States Patent [19]

Tucker et al.

[11] 3,857,616
[45] Dec. 31, 1974

[54] SLIDE FOR PREVENTING EXCESSIVE VIBRATION IN AN ENDLESS TRACK UNIT

[75] Inventors: Emitt M. Tucker, Ashland; J. Morris Tucker, Medford, both of Oreg.

[73] Assignee: Tucker & Sons, Sacremento, Calif.

[22] Filed: Oct. 2, 1973

[21] Appl. No.: 402,808

[52] U.S. Cl. .............................. 305/25, 305/35 EB
[51] Int. Cl. ............................................ B62m 27/02
[58] Field of Search ............ 305/25, 18, 16, 17, 28, 305/35 EB

[56] References Cited
UNITED STATES PATENTS

| | | | |
|---|---|---|---|
| 1,079,164 | 11/1913 | Chenette | 305/16 X |
| 1,568,665 | 1/1926 | Gelly | 305/25 |
| 3,719,242 | 3/1973 | Duclo | 305/25 X |
| 3,787,099 | 2/1974 | Tucker | 305/25 |

Primary Examiner—David Schonberg
Assistant Examiner—John A. Carroll
Attorney, Agent, or Firm—Roger B. Webster

[57] ABSTRACT

A slide for preventing excessive vibration in an endless track unit which is of substantially triangular configuration in side elevation and embodies, on a mount, a drive sprocket assembly at the apex of the track unit, guide wheels at each end of the track unit, and an endless track symmetrical to such triangular configuration, the endless track extending between the guide wheels and having an upper run engaged intermediate its ends over the sprocket assembly; the vibration-preventing slide comprising an elongated, one-piece, antifriction bar of inverted, wide-spread V-form in side elevation, and means rigidly supporting the slide bar from the mount in a position beneath and matchingly engaging the upper run of the endless track for substantially its full length whereby to prevent downward displacement of said upper run from tangent planes extending between the sprocket assembly and said guide wheels.

3 Claims, 5 Drawing Figures

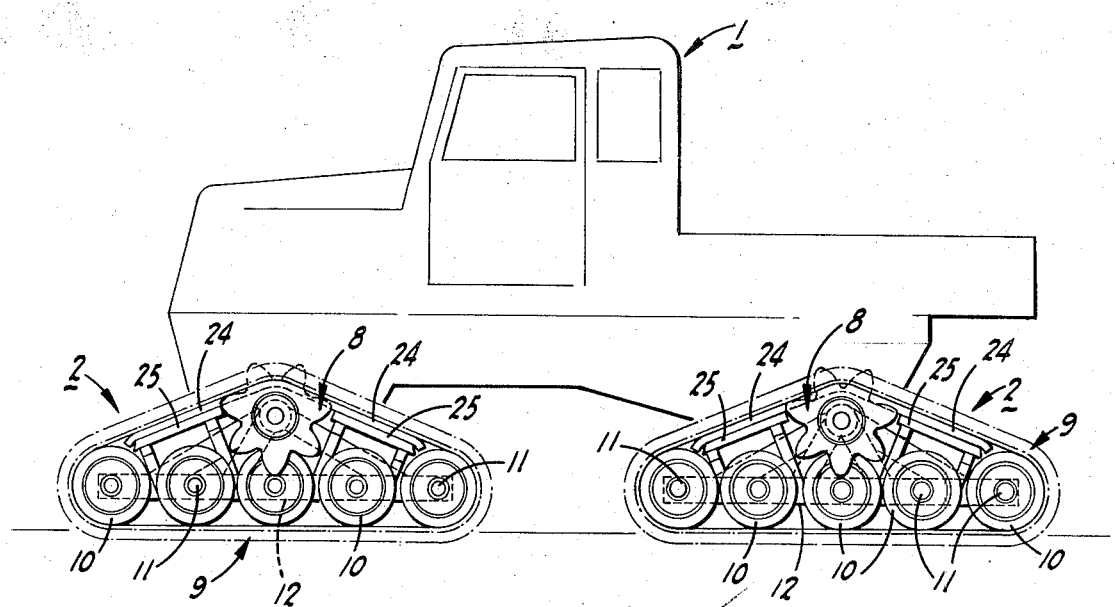
FIG_1
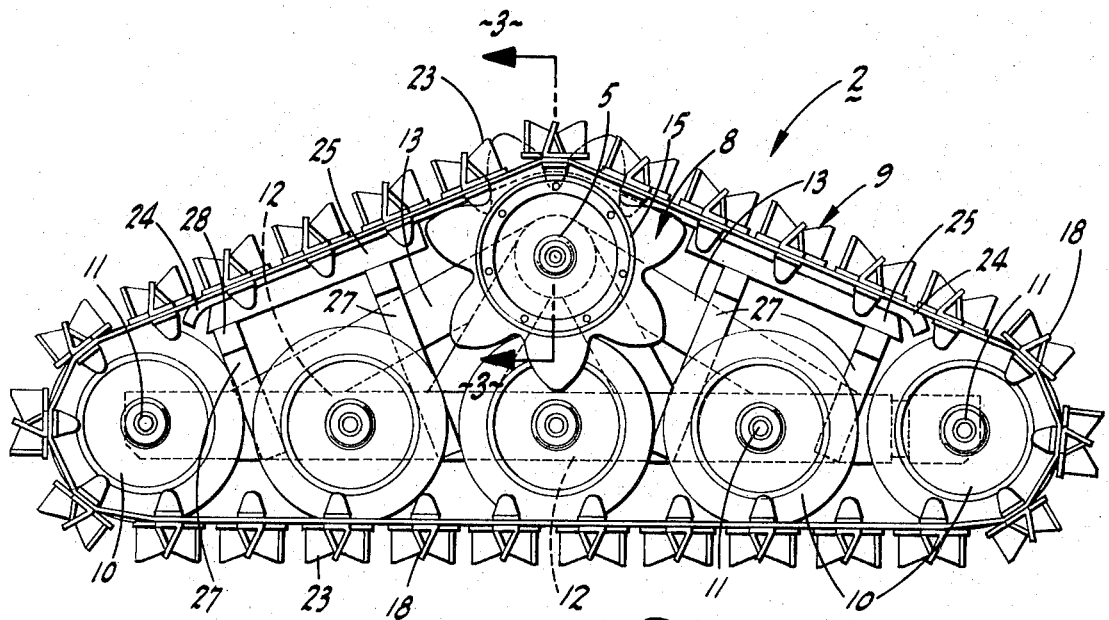
FIG_2

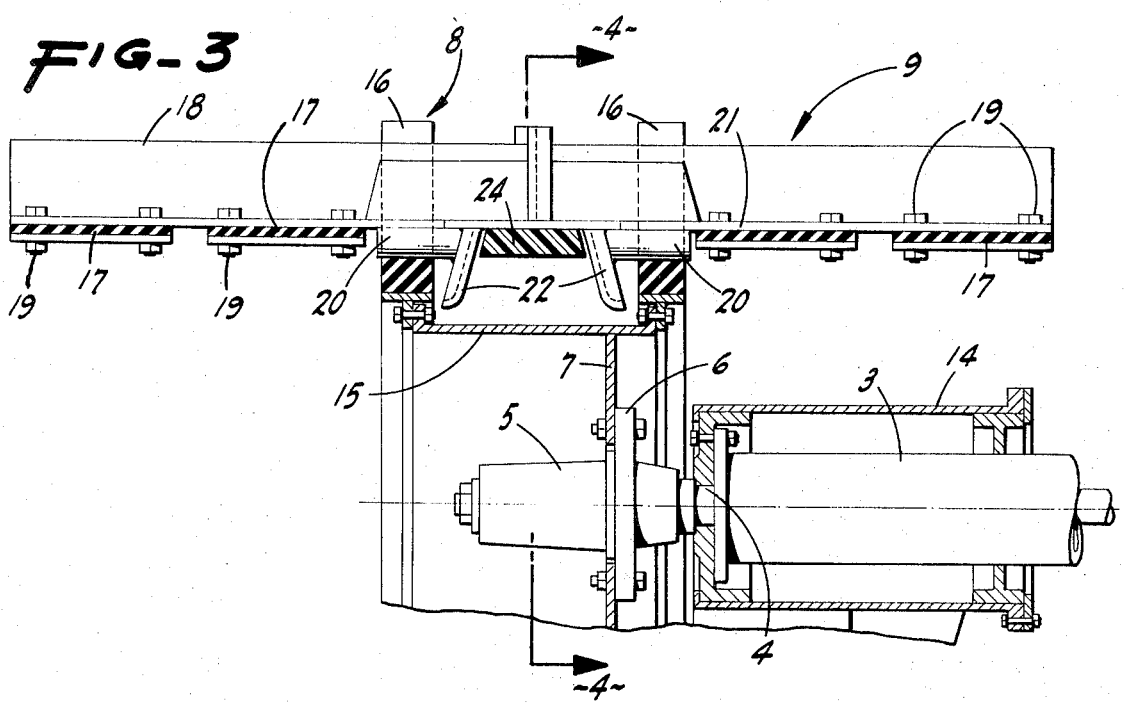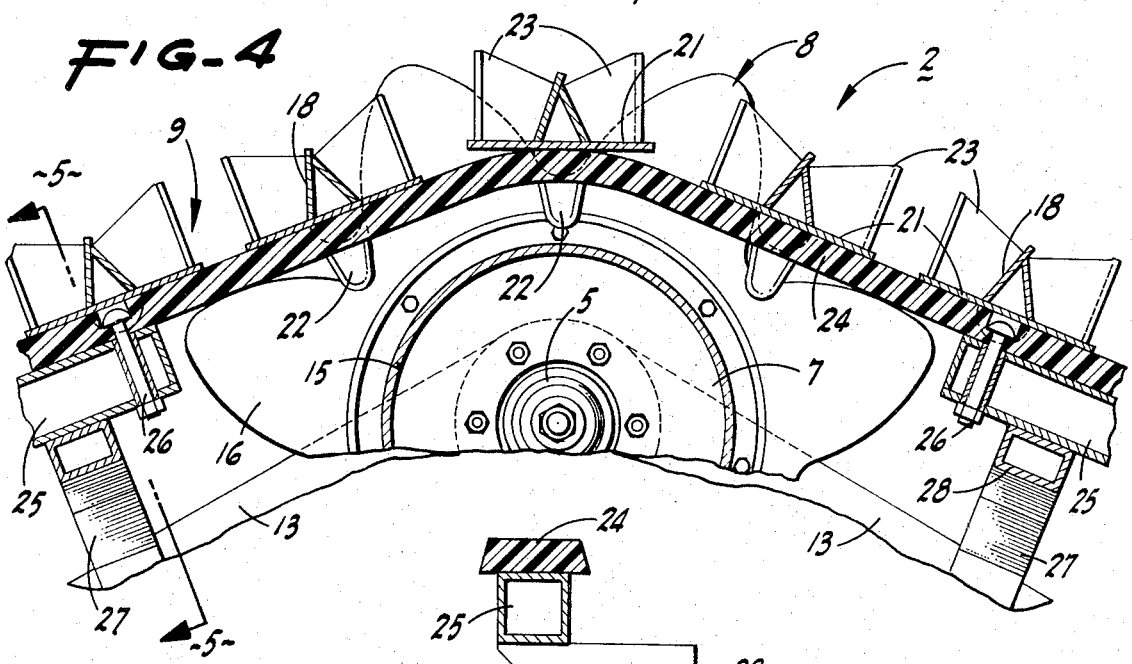

3,857,616

SLIDE FOR PREVENTING EXCESSIVE VIBRATION IN AN ENDLESS TRACK UNIT

BACKGROUND OF THE INVENTION

In the operation of an endless track unit, of the type herein described, the endless track (being comparable to a sprocket-driven roller chain and having like functional characteristics) is—in the absence of preventive means—subject to oscillations produced by what is known as "chordal action;" such oscillations displacing upper run portions of the endless track below normal tangent planes extending between the sprocket assembly and the guide wheels, and, in turn, causing excessive vibration in the track unit. The present invention was conceived in a successful effort to overcome such problem.

SUMMARY OF THE INVENTION

The present invention provides, as a major object, a slide for preventing excessive vibration in an endless track unit which is of substantially triangular configuration in side elevation and embodies, on a mount, a drive sprocket assembly at the apex of the track unit, guide wheels at each end of the track unit, and an endless track symmetrical to such triangular configuration, the endless track extending between the guide wheels and having an upper run engaged intermediate its ends over the sprocket assembly; the vibration-preventing slide comprising an elongated, one-piece, anti-friction bar of inverted, wide-spread V-form in side elevation, and means rigidly supporting the slide bar from the mount in a position beneath and matchingly engaging the upper run of the endless track for substantially its full length whereby to prevent downward displacement of said upper run from tangent planes extending between the sprocket assembly and said guide wheels.

The present invention provides, as another important object, a slide, as in the preceding paragraph, which is of an ultra-high molecular weight polyethylene plastic which is extremely resistant to abrasion and hence resists the wear which the engaged endless track would otherwise impose on such slide.

The present invention provides, as another important object, a slide which—in addition to its anti-vibration function—aids in de-icing the endless track unit when the same is in operation in snow or sub-freezing weather.

The present invention provides, as a further object, a slide for preventing excessive vibration in an endless track unit which is designed for ease and economy of manufacture.

The present invention provides, as a still further object, a practical, reliable, and durable slide for preventing excessive vibration in an endless track unit and one which is exceedingly effective for the purpose for which it is designed.

BRIEF DESCRIPTION OF THE DRAWINGS

FIG. 1 is a side elevation of an all-terrain vehicle including endless track units embodying the present invention.

FIG. 2 is an enlarged side elevation of one of such track units.

FIG. 3 is an enlarged, fragmentary, transverse section taken substantially on line 3—3 of FIG. 2.

FIG. 4 is a fragmentary, longitudinal section taken substantially on line 4—4 of FIG. 3.

FIG. 5 is a fragmentary, transverse section taken substantially on line 5—5 of FIG. 4.

DESCRIPTION OF THE PREFERRED EMBODIMENT

Referring now more particularly to the drawings and to the characters of reference marked thereon, an all-terrain vehicle is indicated generally at 1 and includes, on each side, a front and rear endless track unit, each indicated generally at 2. As such endless track units 2 are essentially of like construction, and as each embodies the present invention, a description of one such track unit will suffice.

The vehicle 1 is provided—for each endless track unit 2—with a laterally extending axle housing 3, from the outer end of which a driven axle 4 projects; the endless track unit comprising a hub 5 journaled on axle 4 and having a flange 6 to which is bolted a radial, internal drive plate 7 of a dual sprocket assembly, indicated generally at 8, and which is hereinafter described in detail.

The dual sprocket assembly 8 runs in mesh with an endless track, indicated generally at 9, which is of substantially triangular form in side elevation (see FIG. 2); the endless track being engaged, at its apex, in driven relation over said dual sprocket assembly.

The lower and traction run of the endless track 9 is defined and guided by a longitudinal wheel train comprised of a plurality of hard-rubber tire, guide wheels 10—of idler type—disposed in a longitudinal row below the dual sprocket assembly 8. The guide wheels 10 are carried by transverse axles 11 journaled in connection with a longitudinal beam 12 disposed in spaced relation below the axle housing 3. The endless track 9 engages, at the ends of the lower and traction run thereof, in direction-changing relation about the endmost guide wheels 10.

By means of downwardly diverging legs 13, the beam 12 is suspended, in rigid relation, from and below a journal tube 14 turnably mounted on the axle housing 3. With the endless track 9 engaged over—and driven by—the dual sprocket assembly 8, and guided in its lower run by the train of wheels 10, and with such wheel train suspended by beam 12 and legs 13 from the journal tube 14, the entire endless track unit 2 can oscillate about the axle housing 3 and axle 4 as an axis.

The dual sprocket assembly 8 comprises—in addition to the internal drive plate 7—a drum 15 in which said drive plate is fixed, and which drum is coaxial with the axle 4. At each end, the drum supports a sprocket 16; the latter being axially alined and spaced apart a predetermined distance for proper meshing engagement with the endless track 9.

The endless track 9 comprises a plurality of endless belts 17 disposed in laterally spaced relation; there being, in the present embodiment, four of such belts with the spacing between the belts adjacent the longitudinal center line of the track relatively wide and of slightly greater width than the dual sprocket assembly 8 which extends at the top upwardly through such space.

The endless belts 17 are spanned, and secured together, on the outside by a multiplicity of full width, transverse traction bars 18; such bars being spaced equidistantly circumferentially of the track and are attached to the belts 17 by bolts 19. The spacing of the traction bar 18 is predetermined in relation to the cog array of sprockets 16, and to the end that the same properly mesh, at the apex of the track, with said traction bars; the latter—in the longitudinal vertical plane of each of the sprockets—being fitted on the backside with a half-round drive saddle 20 with which the related sprocket continuously engages at said apex. The track 9 is thus positively and effectively driven by the described dual sprocket assembly.

Centrally of the ends thereof, and between the corresponding drive saddles 20, each traction bar 18 is formed—on the inside—with a longitudinal, inwardly facing, rigid, plate-like ramp 21 which extends some distance both forwardly and rearwardly of said bar. However, the ends of adjacent ramps, in the circumferential row thereof, are spaced apart somewhat. These wheel ramps 21 provide—in the lower run of the track 9, and at the end-turns thereof—an effective mechanical pathway on which the train of wheels 10 smoothly travels in well-supported relation.

Additionally, the wheel ramps 21 each include, on the inside or working face, a pair of laterally spaced, inwardly projecting wheel guides 22 between which the wheels 10 pass; the effect being to maintain the lower run of the track in proper longitudinal alinement and against undesirable lateral displacement.

On the outside, each wheel ramp 21 includes, in rigid relation, a pair of longitudinally extending, outwardly projecting traction fins 23 disposed centrally of the wheel ramp, and with the fins of such pair on opposite sides of the related transverse traction bar 18.

Each endless track unit 2, as described above, is essentially the subject of co-pending United States patent application Ser. No. 274,737 on ENDLESS TRACK UNIT; the present invention, as embodied in each such track unit, comprising the following:

A slide 24—which is rigidly supported as later described and comprised of an elongated, one-piece, antifriction bar of inverted, wide-spread V-form in side elevation—is disposed beneath the upper run of the endless track 9 in unbroken matching engagement therewith for substantially its entire length; such slide bar 24 being downturned at its ends as shown and terminating closely adjacent the corresponding endmost guide wheels 10.

The slide bar 24, which is flat-faced, rectangular in cross section and relatively narrow, is disposed in the central longitudinal vertical plane of the track 9 (i.e., centrally between the sprockets 16) and thus extends—between the endmost wheels guides 22 of the track—in engagement with the related wheel ramps 21. See FIG. 3.

The configuration, and position, of the slide bar 24 is such that its matching engagement beneath the upper run of the track 9 maintains such run against downward displacement (due to oscillations otherwise caused by the so-called "chordal" effect) from tangent planes extending between the sprockets 16 and the endmost guide wheels 10, and thus excessive vibration of such run is effectively prevented. This assures of a smoother running track unit, with a substantial reduction in wear and tear on it.

Further, as the slide bar 24 bridges through the working zone of the sprockets 16, proper driving engagement between the cogs of the sprockets and the cog-engaged traction bars 18 is assured.

Also, when the track unit is operating in snow, or sub-freezing weather, the slide bar 24 aids in de-icing such track unit.

The slide bar 24, which is preferably of an ultra-high molecular weight polyethylene plastic (which affords great strength as well as an antifriction slide surface) is rigidly supported in place in each track unit 9 as follows:

The portions of the slide bar 24 which extend between the sprockets 16 and the endmost guide wheels 10 are each fitted on the underside with a stiff, metallic, longitudinal backing or stiffening rib 25 secured in place by recessed-head bolts 26.

A plurality of longitudinally spaced posts 27 are fixed on and upstand from the beam 12 which is the primary member of the mount for the components of the track unit; such posts—at their upper ends, and which include lateral offsets 28—being (in pairs) attached in fixed, supporting relation to corresponding backing ribs 25. In this manner, the slide bar 24 becomes a fixed, unitary part of the aforesaid mount, and always remains in proper position supporting and guiding the upper run of the endless track 9 in the desired tangent planes and for the purposes herein described.

From the foregoing description, it will be readily seen that there has been produced such a slide for preventing excessive vibration in an endless track unit as substantially fulfills the objects of the invention, as set forth herein.

While this specification sets forth in detail the present and preferred construction of the slide for preventing excessive vibration in an endless track unit, still in practice such deviations from such detail may be resorted to as do not form a departure from the spirit of the invention as defined by the appended claims.

We claim:

1. In an endless track unit which includes a longitudinal mount having ends, an endless track extending about the mount, track guide wheels on the ends of the mount, dual transversely spaced sprockets engaged from below with the upper run of the track intermediate the ends thereof, the track having transverse, sprocket-engaged traction bars spaced apart circumferentially of the track, and rigid plate-like wheel ramps fixed on the inside of the traction bars for passage between the sprockets; the improvement characterized by the inclusion, in such track unit, of longitudinal slide means disposed in fixed relation beneath said upper run and matchingly engaging the portions thereof between the sprockets and the guide wheels whereby to prevent downward displacement of said portions from planes tangent to such sprockets and guide wheels, and means rigidly supporting the slide means from the mount; the slide means comprising an elongated slide bar engaging such upper run for substantially its full length and in the plane of the wheel ramps whereby the latter engage the slide bar.

2. In an endless track unit which is triangular in side elevation and includes a longitudinal mount having ends, an endless track extending about the mount, track guide wheels on the ends of the mount, dual transversely spaced sprockets engaged from below with the upper run of the track intermediate the ends thereof, the track having transverse, sprocket-engaged traction bars spaced apart circumferentially of the track, rigid plate-like wheel ramps fixed on the inside of the traction bars for passage between the sprockets, and inwardly projecting, transversely spaced wheel guides on the ramps; the improvement characterized in the inclusion, in such track unit, of longitudinal slide means disposed in fixed relation beneath said upper run and matchingly engaging the portions thereof between the sprockets and the guide wheels whereby to prevent downward displacement of said portions from planes tangent to such sprokets and guide wheels, and means rigidly supporting the slide means from the mount; the slide means comprising an elongated slide bar engaging such upper run for substantially its full length and in the plane of the wheel ramps whereby the latter engage said slide bar with the latter between said wheel guides.

3. In an endless track unit which includes a longitudinal mount having ends, an endless track extending about the mount, track guide wheels on the ends of the mount, and a driving sprocket engaged from below with the upper run of the track intermediate the ends thereof; the improvement characterized by the inclusion, in such track unit, of longitudinal slide means disposed in fixed relation beneath said upper run and matchingly engaging the portions thereof between the sprocket and the guide wheels whereby to prevent downward displacement of said portions from planes tangent to such sprocket and guide wheels, and means rigidly supporting the slide means from the mount; the track unit being generally triangular in side elevation and with the sprocket at the apex of such unit; the slide means comprising, of plastic, an elongated, one-piece, antifriction slide bar of inverted, wide-spread V-form in side elevation, the slide bar matchingly engaging such upper run for substantially its full length; and the supporting means for the plastic slide bar comprising backing ribs rigidly secured thereto between the sprocket and guide wheels, and posts fixed to and extending between the backing ribs and the mount.

* * * * *